US006563805B1

(12) United States Patent
Ma et al.

(10) Patent No.: US 6,563,805 B1
(45) Date of Patent: May 13, 2003

(54) DIGITAL RADIO PREPAID MUSIC RECORDING SYSTEM

(75) Inventors: Hien Duc Ma, Delray Beach, FL (US); Argyrios A. Chatzipetros, Lake Worth, FL (US)

(73) Assignee: XM Satellite Radio, Inc., Washington, DC (US)

( * ) Notice: Subject to any disclaimer, the term of this patent is extended or adjusted under 35 U.S.C. 154(b) by 0 days.

(21) Appl. No.: 09/434,751

(22) Filed: Nov. 5, 1999

(51) Int. Cl.[7] .............................................. H04B 7/204
(52) U.S. Cl. ...................... 370/325; 370/316; 455/3.02; 455/3.06
(58) Field of Search ............................... 455/3.02, 558, 455/42, 344, 557, 3.06; 370/316, 312, 310, 486, 325

(56) References Cited

U.S. PATENT DOCUMENTS 5,898,680 A * 4/1999 Johnstone et al. .......... 370/316
5,914,941 A * 6/1999 Janky ......................... 370/313

* cited by examiner

Primary Examiner—Edward F. Urban
Assistant Examiner—Tilahun Gesesse
(74) Attorney, Agent, or Firm—Benman, Brown & Williams

(57) ABSTRACT

A device for prepaid recording of digital audio signals. In a system where digital radio signals are received in an encoded format, a digital converter that is enabled by a smartcard module is employed to convert encoded digital signals to decoded digital signals for recording onto a digital storage media. A smartcard having a prepaid account balance is employed to authorize and control the recording of digital signals. A buffer is advantageously employed to store a quantity of digital signals prior to recording.

25 Claims, 2 Drawing Sheets

DIGITAL RADIO PREPAID MUSIC RECORDING SYSTEM

BACKGROUND OF THE INVENTION

1. Field of the Invention

The present invention relates to prepaid digital audio recorders. More specifically, the present invention relates to replaceable media digital radio prepaid smartcard enabled recorders.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Satellite radio operators will soon provide digital quality radio broadcast services covering the entire continental United States. These services intend to offer approximately 100 channels, of which nearly 50 channels will provide music with the remaining stations offering news, sports, talk and data channels. According to C. E. Unterberg, Towbin, satellite radio has the capability to revolutionize the radio industry, in the same manner that cable and satellite television revolutionized the television industry.

Satellite radio has the ability to improve terrestrial radio's potential by offering a better, digital, audio quality, greater coverage and fewer commercials. Accordingly, in October of 1997, the Federal Communications Commission (FCC) granted two national satellite radio broadcast licenses. The FCC allocated 25 megahertz (MHz) of the electromagnetic spectrum for satellite digital broadcasting, 12.5 MHz of which are owned by CD Radio and 12.5 MHz of which are owned by the assignee of the present application "XM Satellite Radio Inc.". The system plan for each licensee presently includes transmission of substantially the same program content from two or more geosynchronous satellites to both mobile and fixed receivers on the ground. In urban canyons and other high population density areas with limited line-of-sight (LOS) satellite coverage, terrestrial repeaters will simultaneously broadcast the same program content in order to improve coverage reliability.

In accordance with the XM frequency plan, each of two geosynchronous Hughes 702 satellites will transmit identical or at least similar program content. The signals will be transmitted with QPSK digital modulation. The assigned 12.5 MHz bandwidth is called the "XM" band. The modulation scheme allows up to 4096 Mbits/s of total user data to be distributed across the available bandwidth.

The new XM band broadcast system will deliver a large volume of digital quality audio, including music to end users. Since digital quality recording devices are now commercially available, such a radio service creates the opportunity to deliver digital quality recording capability direct to end users without the need for mass distribution of prerecorded media. However, the convenient ability to do so creates a problem of potential piracy of copyrighted materials at full digital fidelity levels and a general dilution of the commercial record distribution market. Producers of audio content would suffer a loss of revenues.

Thus there is a need in the art for a device to deliver digital quality recording capability to end users while at the same time retaining control of such distribution so that copyright owners are fairly compensated for the distribution of their works.

SUMMARY OF THE INVENTION

The need in the art is addressed by the apparatus and methods of the present invention. The inventive apparatus operates with a satellite digital radio broadcast system in which digital radio signals are received by a satellite digital audio service receiver which includes a digital radio receiver, a playback circuit, and an output circuit arranged such that the digital radio receiver converts the received digital radio signals to encoded digital signals and feeds them to the playback circuit which converts the encoded digital signals to audio signals for playing through the output circuit.

The inventive apparatus includes a digital converter which receives the encoded digital signals from the digital radio receiver and converts them to decoded digital signals. The digital converter has an enabling input which enables it to convert the encoded digital signals to decoded digital signals which are a suitable form for recording onto digital recording media. The inventive apparatus also includes a smartcard module which receives a smartcard that has a prepaid account balance stored on it. The smartcard module has an enabling output coupled to the enabling input of the digital converter. Therefore, if the account balance on the smartcard is sufficient, the smartcard module enables the digital converter to convert the encoded digital signals to decoded digital signals. A digital recorder receives the decoded digital signals and records them onto a digital medium.

In addition, a digital buffer may be provided for storing a quantity of the encoded digital signals and subsequently delivering same to the digital converter. This buffering ability allows the storage of the digital signal thereby creating a time delay between the real time delivery of audio program selections and the later availability of the signals for recording. This delay allows the user to determine the content of the real time selection by listening to the real time broadcast and subsequently make a decision to record same. Provided that the beginning of a given audio selection is present in the buffer at the time the users elects to record the selection, the entire selection can be recorded, even though the real time beginning of the selection has already passed in time.

DESCRIPTION OF THE INVENTION

Illustrative embodiments and exemplary applications will now be described with reference to the accompanying drawings to disclose the advantageous teachings of the present invention.

Figure 1:
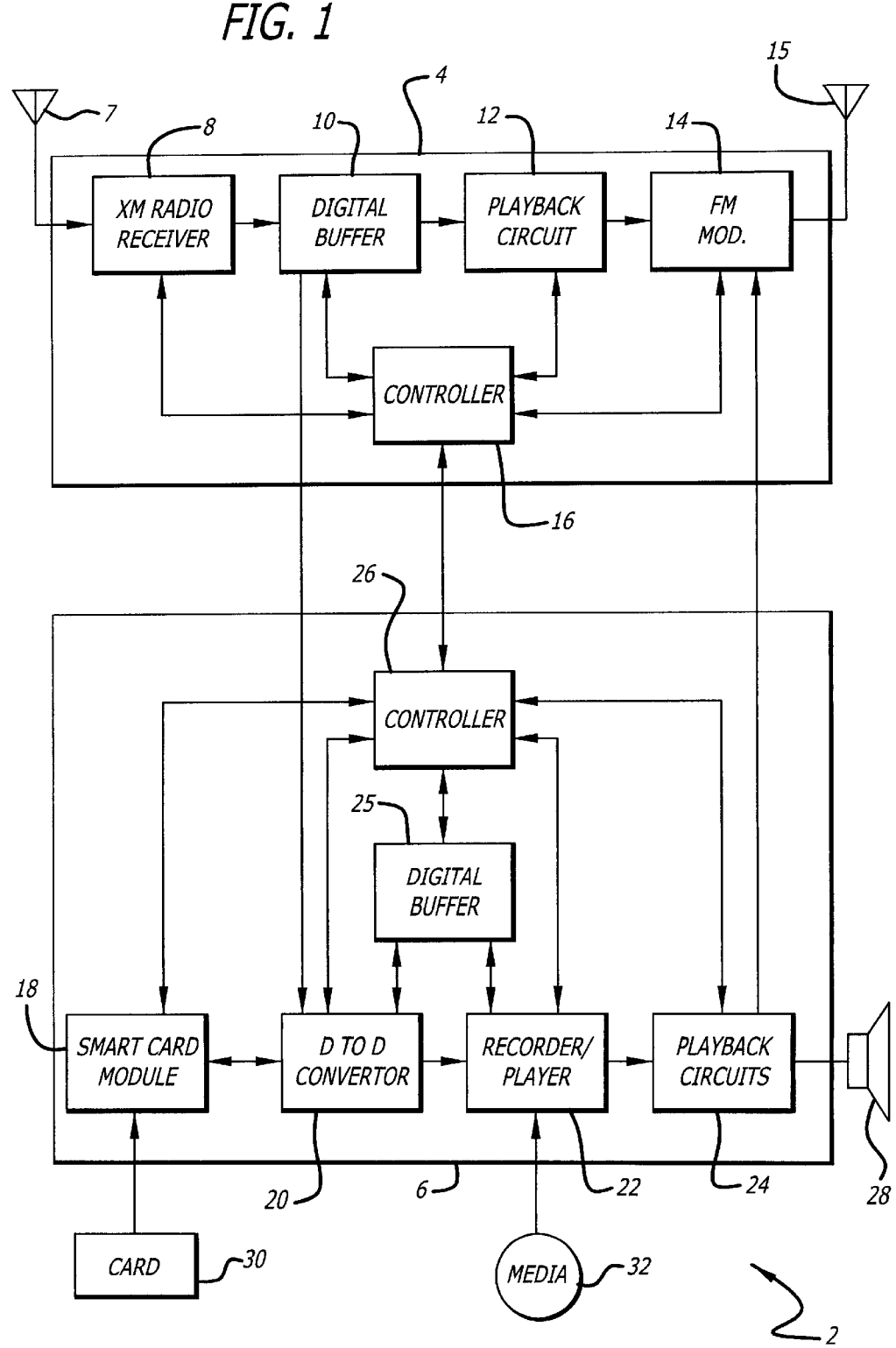
FIG. 1 is a block diagram of the preferred embodiment of the prepaid recording system of the present invention.

Reference is directed to FIG. 1 which depicts a system for prepaid recording of digital audio signals 2 implemented in accordance with the present teachings. A satellite digital audio service receiver 4 is coupled to a device for recording decoded digital signals 6. It is also understood that these two units may be assembled into a single device if desired. Within the satellite digital audio service receiver 4 is an XM radio receiver 8 which receives digital radio signals via antenna 7 from satellite or terrestrial transmitters (not shown) and demodulates the signals, producing encoded digital signals. The scheme of digital radio signal modulation and the encoding scheme of the encoded digital signals are explained in detail in co-pending U.S. application Ser. No. 09/318,296 filed by Marko et al. on May 25, 1999, the teachings of which have been incorporated herein by reference. Generally, the encoding scheme follows one of the Motion Picture Expert Group (hereinafter "MPEG") encoding schemes which are advantageous because of the ability of such encoding schemes to compress digital audio data allowing lower bit rates and less memory to transmit and store digital quality audio signals. However, those skilled in the art will understand that the encoding scheme does not necessarily need to be according to one of the MPEG formats. Any encoding format, whether a promulgated standard or proprietary scheme, will suffice. The significant aspects of the encoding scheme are the compression of digital audio signals and the relative inapplicability for direct recording onto digital media. The significance of the latter aspect will discussed more fully hereinafter.

The encoded digital signals are fed into a digital buffer 10. The digital buffer in the preferred embodiment is random access memory which can be any of dynamic RAM, static RAM, FLASH memory, or other suitable write-able and readable digital memory. In the preferred embodiment, the digital buffer 10 has a memory capacity adequate for storing enough digital data to translate into a reasonable period of playback time when the digital data is ultimately decoded and converted to an analog signal. For example, a period from a few minutes to an hour or more would be a suitable time duration. The factors contemplated in selecting such storage capacity are the cost and size of the memory employed and the feature set desired by the end user of the system. The buffer control may be configured as a first-in-last-out, a first-in-first-out, or a random access buffer addressed by the beginning address of any given selection. The flow, control, and buffering of encoded digital data between the digital radio receiver 8 and digital buffer 10 is controlled by controller 16. The controller 16 may be any suitable microprocessor or microcontroller as are well known in the art.

In a standard receiving and playing mode of operation, the digital buffer 10 outputs the encoded digital signal, either directly without buffering or indirectly after buffering, to a playback circuit 12. The playback circuit 12 serves the function of converting the encoded digital signal directly to an audio signal for direct playback. The circuitry must be capable of decoding the encoded digital data, such as an MPEG format, and converting the signal to an audio signal, typically a stereo audio signal. Such playback circuits will be known to those skilled in the art, and designs are commercially available for immediate implementation.

In an illustrative embodiment, the satellite digital audio service receiver 4 is operated in a mobile environment, such as an automobile. Rather than incorporate a separate audio amplifier and loudspeakers within the satellite digital audio service receiver 4, the FM radio and speaker system typically present in most automobiles, is used to advantage. The output of analog audio signals from playback circuit 12 are fed into an FM modulator 14 and thereafter broadcast at low power via antenna 15, in accordance with FCC Rules Part 15 et seq., within the commercial FM broadcast band. In this way, the FM radio system present in the automobile (not shown) can tune to the frequency of broadcast, receive, and play the audio signals through the existing loudspeakers within the automobile. See co-pending U.S. Patent Applications entitled System For Providing Signals From An Auxiliary Audio Source To A Radio Receiver Using A Wireless Link, filed Mar. 5, 1999, by S. Patsiokas, Ser. No. 09/263,207 and System For Providing Audio Signals From An Auxiliary Audio Source To A Radio Receiver Via A DC Power Line, filed May 5, 1998 by A. Nguyen et al., Ser. No. 09/310,352, the teachings of both of which are hereby incorporated herein by reference.

The audio signals output from playback circuit 12 can also be made available at a low power output (not shown) for interface to a headset (not shown) so that the user can listen to the audio signal directly from the satellite digital audio service receiver 4.

Controller 16 is interfaced to the digital radio receiver 8, digital buffer 10, playback circuit 12 and output circuit 14. The controller is programmed to control the flow and routing of the various signals and also provides a user interface. The user interface allows the user to tune the digital radio receiver 8 to the desired radio channel, select direct or buffered playback, and other general user interface needs.

One of the principal benefits of the present invention is the ability of the user to record digital audio selections onto portable digital media 32. Since the ability to make such a portable digital recording has value in the marketplace, as is evidenced by the broad market for prerecorded music, the present invention provides a means for users to prepay for such recording capability and implement it at will.

To accomplish the prepaid recording of digital audio signals, the preferred embodiment includes a device for recording decoded digital signals 6. This device 6 includes a digital converter 20 which is coupled to the digital buffer 10 and operates to convert the encoded digital signals to decoded digital signals. Decoded digital signals differ from encoded digital signals in that they are suitable for direct recording onto the digital media 32. In an illustrative embodiment, the media 32 may be a CD-ROM or DVD-ROM and the decoded digital signals follow the industry standard stereo digital recording scheme, as is well known in the digital recording arts. However, any other popular or proprietary decoded digital scheme may be employed, such as that utilized in the MP3 player format, Minidisc format, or digital audio tape format.

The digital converter 20 will not operate to convert encoded digital signals to decoded digital signals unless it is enabled to do so. This provided the essential on-off control of the recording ability to the end user. The digital converter 20 has an enabling input to so enable the digital conversion.

The enabling input of digital converter 20 is coupled to an enabling output of smartcard module 18. Smartcard module 18 accepts a smartcard 30, within which is stored an encrypted key and an account balance. The smartcard may be a flash memory card or other storage device that is known to those skilled in the art. The above-referenced related co-pending U.S. patent application Ser. No. 09/388,926, filed by Hien D. Ma et al. on Sep. 2, 1999 describes a typical smartcard implementation. In operation, the user purchases a smartcard 30 which has an account balance stored thereon. The units of the account balance may be a quantity of songs that may be recorded, a quantity of time duration of audio signals that may be recorded, a quantity of record albums that may be recorded, a monetary value, or other suitable measure of the account balance. The smartcard 30 is inserted into smartcard module 18, which is adapted to read and write to the smartcard 30. In addition, the smartcard module 18 can verify the authenticity of the encryption key so as to prevent fraudulent operation of the device. The operation of the smartcard module 18 in conjunction with the digital converter 20 will be more fully described hereinafter.

The decoded digital signals output from digital converter 20 are coupled to the input of digital recorder 22. Digital recorder 22 may be a write-able CD-ROM recorder or other digital recording device such as a Minidisk recorder, digital audio tape (DAT) recorder, MP3 recorder, flash memory recorder, or other suitable digital recorder as are known, or become known to those skilled in the art. A principal aspect of digital recorder 22 is that media 32 is portable. In this way, the user creates a recording that is portable and may be removed from digital recorder 22 to be played in another digital player, such as a home stereo, portable stereo, car stereo, or the like. The net effect is that the user can record a digital quality recording and possess a copy that can be played at will, just as any commercially produced pre-recorded digital recording. In essence, the end user buys a prerecorded recording by buying a smartcard and creating the recording as desired.

In the preferred embodiment, digital recorder 22 is also equipped with a playback circuit so that the device can replay the recorded media 32. Playback circuit 24 is coupled to the output of the digital recorder 22 and serves the function of converting the decoded digital signals, which have been previously recorded on media 32 to analog audio signals. The analog audio signals can be played directly through loudspeaker 28, or an earphone (not shown). In addition, in the preferred embodiment, the analog audio signals output by playback circuit 24 are coupled to output circuit 14 in the satellite digital audio service receiver 4 so that the same benefit of coupling to the automobile stereo radio, described herein before, can be realized.

Within the device for recording decoded digital signals 6 is a controller 26 which is interfaced to smartcard module 18, digital converter 20, digital recorder 22 and playback circuit 24. The controller 26 also provides a user interface for operation of the device to select, record, and play signals, in addition to management of the account balance and other customary controls of such an audio device.

In an illustrative embodiment, the device for recording decoded digital signals 6 may also include a digital buffer 25 which is coupled to the digital to digital converter 20 and controller 26. The digital buffer has a substantial quantity of recording time capability such that it is equal to as much as the duration of an entire CD-ROM recording. The digital buffer can be filled with encoded digital signals. During periods when no reception is possible or during times when the device for recording digital signals 6 is not engaged to the satellite digital audio service receiver 4, the user can select to replay the content of the digital buffer 25. Such playback is enable by the smartcard module 18 in the same fashion as with the recording of decoded digital signals in that the smartcard module must be present with sufficient account balance.

In the preferred embodiment, the integration between the satellite digital audio service receiver 4 and the device for recording decoded digital signals 6 includes not only the coupling of the encoded digital signals between digital buffer 10 and digital converter 20, and the coupling of analog audio signals between playback circuit 24 and output circuit 14, but also includes an interface between controller 16 and controller 26. This interface, which may be accomplished with bi-directional, serial communications or other suitable means, serves to allow tight integration between the units. In particular, advantageous control of the digital buffer and accounting of the account balance are achieved, as will be described in detail hereinafter.

In the preferred embodiment, the satellite digital audio service receiver 4 and the device for recording decoded digital signals 6 are separate units which are coupled by cables. Therefore, the device for recording digital signals 6 can be removed from the vehicle for portable operation. The aforementioned digital buffer 25 or media 32 can be used as the source of audio data in the portable mode of operation.

Figure 2:
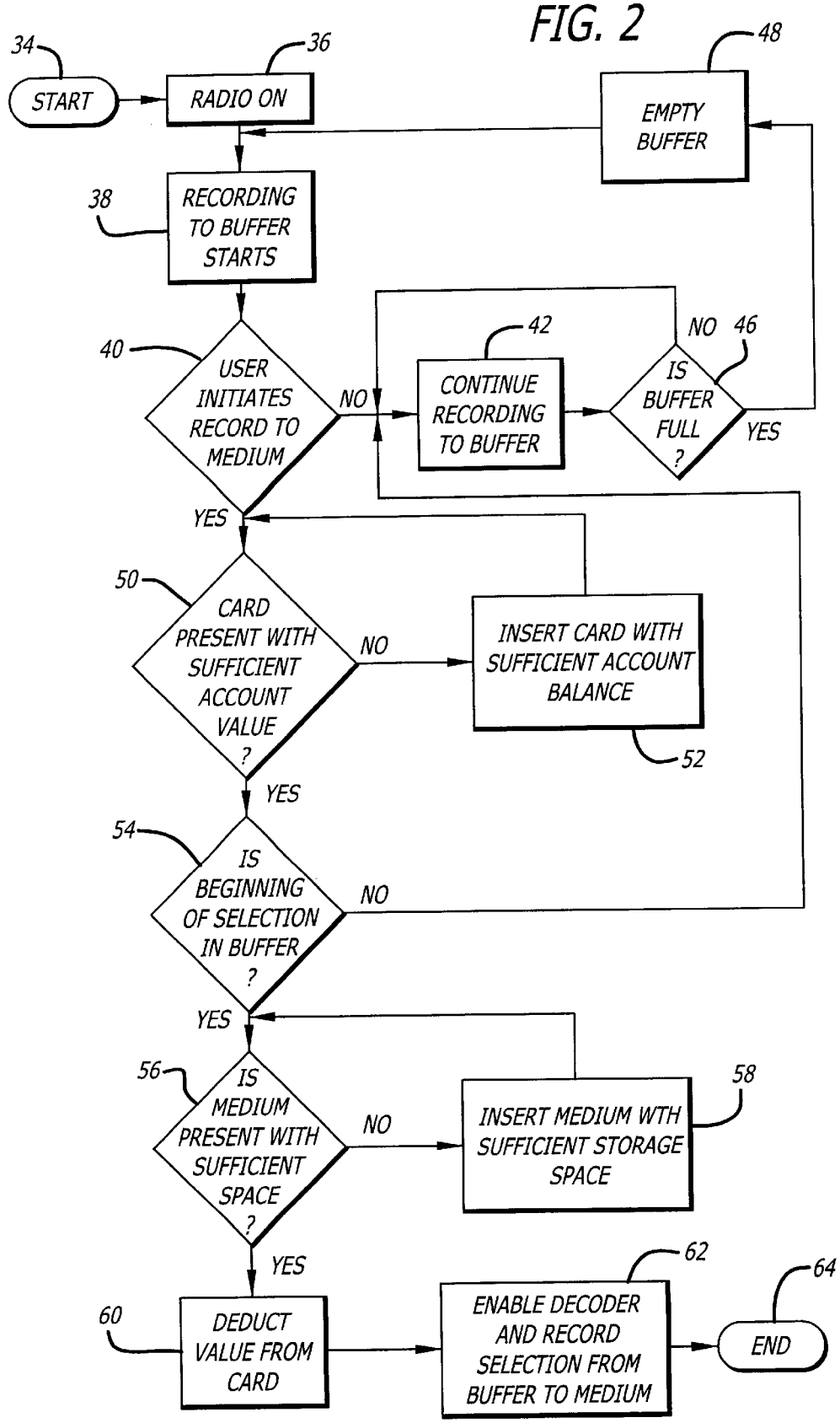
FIG. 2 is a flow chart of the preferred embodiment.

Reference is directed to FIG. 2 which is a flow diagram of the operation of the preferred embodiment. In operation, the process starts at step 34 and proceeds to step 36 when the radio is turned on. The radio in this process includes both the satellite digital audio service receiver 4 (FIG. 1) and the device for recording decoded digital signals 6 (FIG. 1). Recording to the digital buffer of the currently received encoded digital commences at step 38. If the user does not initiate recording to the media at step 40, recording to the digital buffer continues at step 42 until the buffer is determined to be full at step 46. Once the buffer is determined to be full at step 46, the buffer is emptied at step 48 and flow recirculates to step 38 where recording to the buffer begins anew. However, it is understood that in the case of a first-in-first-out buffer, the buffer never needs to be erased, but rather encoded digital signals which are earlier in time than the duration of the buffer are merely lost as they are replaced by more recent encoded digital signals.

On the other hand, if the user does initiate recording to the media at step 40, the presence of a smartcard in the smartcard module and the sufficiency of the account balance on the smartcard are tested at step 50. In the event either of these tests fails, the user is advised to insert a card with sufficient account balance at step 52, which then returns to step 50 to recheck the smartcard.

If the test of step 50 is successful, flow continues to step 54, which tests to determine if the beginning of the selection selected for recording by the user is present in the digital buffer. This step illustrates an advantage of the use of the digital buffer. Because a quantity of the desired selection can be stored in the digital buffer, the user can make the decision to record a selection after it has begun and the nature of the selection has become obvious to the user. This overcomes a basic problem in recording from a real-time audio source, such as a radio, in that there typically will be no prior announcement of upcoming audio selections. If the recording duration of the buffer is longer than the duration of the desired selection, the user can record the selection in its entirety from the digital buffer, rather than off-the-air from the radio source in real time.

In the event the beginning of the selected selection is not present in the digital buffer at step 54, the user is advised of this fact via the user interface and a partial recording, subject to a debit of the account balance on the smartcard is avoided. Flow then recirculates to step 42 and so forth until another selection is selected by the user at step 40.

On the other hand, at step 54, if the beginning of the selection is present in the digital buffer, a test is conducted at step 56 to determine if media is present in the recorder and whether the media has sufficient capacity to record the selected selection. If not, the user is advised to insert suitable media in the recorder at step 58 and the test is conducted again at step 56. If, at step 56, suitable media is present, the account balance is debited on the smartcard by the smartcard module at step 60 and the digital converter is enable at step 62, together with activation of the recorder, to record the selection from the buffer and/or from the digital radio receiver. Upon completion of the recording process, the process ends at step 64.

Related subject matter is disclosed and claimed in co-pending U.S. Patent Application entitled Method and Apparatus for Providing Prepaid Music Card for Deciphering Recorded Broadcast Audio Signal, Ser. No. 09/388,926, filed by Hien D. Ma et al. on Sep. 2, 1999; and co-pending U.S. Application entitled Low Cost Interoperable, Satellite Digital Audio Radio Service Receiver Architecture, Ser. No. 09/318,296, filed by P. Marko et al. on May 25, 1999; both of these applications being expressly incorporated herein by reference.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for prepaid recording of decoded digital audio signals from a satellite digital radio broadcast system wherein digital radio signals are received by a satellite digital audio service receiver which includes a digital radio receiver, a playback circuit, and an output circuit arranged such that the digital radio receiver converts the received digital radio signals to encoded digital signals and outputs them to an input of the playback circuit which converts the encoded digital signals to audio signals for playing through the output circuit; the device comprising:

a digital converter, for converting the encoded digital signals to decoded industry standard audio storage format signals, said converter having an input for receiving the encoded digital signals from the satellite digital audio service receiver, an output for outputting the decoded signals, and an enabling input for enabling said digital converter to convert the encoded digital signals to decoded signals;

a smartcard module for receiving a smartcard having a prepaid account balance stored thereon, said smartcard module having an enabling output coupled to said enabling input, and wherein said enabling output enables said enabling input if a smartcard having a prepaid account balance greater than zero is presently inserted into said smartcard module; and a digital recorder having an input coupled to said output of said digital converter for receiving the decoded signals, said digital recorder adapted to receive a recording medium and record thereon the decoded signals.

2. The invention of claim 1 wherein said digital recorder is adapted to receive a CD-ROM recording medium.

3. The invention of claim 1 wherein said digital recorder is adapted to receive a Mini-Disk recording medium.

4. The invention of claim 1 wherein said digital recorder is adapted to receive a Digital Audio Tape recording medium.

5. The invention of claim 1 wherein said digital recorder is adapted to receive a memory card recording medium.

6. The invention of claim 1 wherein said digital recorder further comprises a playback circuit adapted to read the decoded signals from said recording medium, said playback circuit having a converter for converting the decoded signals to audio signals, said playback circuit having an output for outputting said audio signals.

7. The invention of claim 6 wherein said output of said playback circuit is coupled to the input of the output circuit of the satellite digital audio service receiver.

8. A device for prepaid recording of decoded digital audio signals from a satellite digital radio broadcast system wherein digital radio signals are received by a satellite digital audio service receiver which includes a digital radio receiver, a buffer, a playback circuit, and an output circuit arranged such that the digital radio receiver converts the received digital radio signals to encoded digital signals and outputs them to an input of the digital buffer that stores a quantity of the encoded digital signals, the digital buffer having an output coupled to an input of the playback circuit which converts the encoded digital signals to audio signals for playing through the output circuit; the device comprising:

a digital converter, for converting the encoded digital signals to decoded industry standard audio storage format signals, said converter having an input for receiving the encoded digital signals from the output of the buffer in the satellite digital audio service receiver, an output for outputting the decoded signals, and an enabling input for enabling said digital converter to convert the decoded digital signals to decoded signals;

smartcard module for receiving a smartcard having a prepaid account balance stored thereon, said smartcard module having an enabling output coupled to said enabling input;

a digital recorder having an input coupled to said output of said digital converter for receiving the decoded signals, said digital recorder adapted to receive a recording medium and record thereon the decoded signals; and means for enabling said digital recorder if the account balance on said smartcard is above a predetermined amount.

9. The invention of claim 8 wherein said digital recorder is adapted to receive a CD-ROM recording medium.

10. The invention of claim 8 wherein said digital recorder is adapted to receive a Mini-Disk recording medium.

11. The invention of claim 8 wherein said digital recorder is adapted to receive a Digital Audio Tape recording medium.

12. The invention of claim 8 wherein said digital recorder is adapted to receive a memory card recording medium.

13. The invention of claim 8 wherein said digital recorder further comprises a playback circuit adapted to read the decoded signals from said recording medium, said playback circuit having a converter for converting the decoded signals to audio signals, said playback circuit having an output four outputting said audio signals.

14. The invention of claim 13 wherein said output of said playback circuit is coupled to the input of the output circuit of the satellite digital audio service receiver.

15. The invention of claim 8 further comprising:

a digital buffer having an output coupled to said input of said digital converter and having an input coupled to receive encoded digital signals for storage in said digital buffer, and wherein stored encoded digital signals are output to said digital converter for playback through said playback circuit.

16. A system for prepaid recording of decoded digital audio signals from a satellite digital radio broadcast system; the system comprising:

a satellite digital audio service receiver, for receiving digital radio signals, further comprising;

a digital radio receiver having an input for receiving the digital radio signals and an output for outputting encoded digital signals, said digital radio receiver adapted to convert the digital radio signals to encoded digital signals;

a buffer for storing a quantity of encoded digital signals, and having an input coupled to said output of said digital radio receiver and an output for outputting stored encoded digital signals, a playback circuit adapted to convert the encoded digital signals to audio signals, and having an input coupled to said output of said buffer, and an output for outputting said audio signals;

an output circuit for outputting said audio signals, and having an input for receiving said audio signals from said output of said playback circuit and a device for recording decoded digital signals, further comprising;

a digital converter, for converting said encoded digital signals to decoded industry standard audio storage format signals, said converter having an input for receiving said encoded digital signals from said output of said buffer in said satellite digital audio service receiver, an output for outputting said decoded signals, and an enabling input for enabling said digital converter to convert said encoded digital signals to decoded signals;

a smartcard module for receiving a smartcard having a prepaid account balance stored thereon, said smartcard module having an enabling output coupled to said enabling input, and wherein said enabling output enables said enabling input if a smartcard having a prepaid account balance greater than zero is presently inserted into said smartcard module;

a digital recorder having an input coupled to said output of said digital converter for receiving said decoded signals, said digital recorder adapted to receive a recording medium and record thereon the decoded signals.

17. The invention of claim 16 wherein said digital recorder is adapted to receive a CD-ROM recording medium.

18. The invention of claim 16 wherein said digital recorder is adapted to receive a Mini-Disk recording medium.

19. The invention of claim 16 wherein said digital recorder is adapted to receive a Digital Audio Tape recording medium.

20. The invention of claim 16 wherein said digital recorder is adapted to receive a memory card recording medium.

21. The invention of claim 16 wherein said digital recorder further comprises a playback circuit adapted to read the decoded signals from said recording medium, said playback circuit having a converter for converting the decoded signals to audio signals, said playback circuit having an output for outputting said audio signals.

22. The invention of claim 16 wherein said output of said playback circuit is coupled to said input of said output circuit of said satellite digital audio service receiver.

23. A method of prepaid recording of decoded digital audio signals from a satellite digital radio broadcast system by a satellite digital audio service receiver and a device for recording decoded digital signals, which include a digital radio receiver, a buffer, a digital converter, a digital reorder for recording to a digital medium, a smartcard module, and a smartcard having an account balance stored thereon; comprising the steps of:

receiving digital radio signals by the digital radio receiver and outputting encoded digital signals;

storing a portion of said encoded digital signals in the buffer;

initiating a recording function to record a selection of said decoded digital signals;

reading the smartcard by the smartcard module to determine the value of an account balance stored thereon and if said account balance value is greater than zero, enabling the digital converter to convert said encoded digital signals to decoded industry standard audio storage format signals;

recording said decoded signals by the digital recorder to a recording medium, and writing to the smartcard thereby reducing said account balance value in accordance with the quantity of decoded digital signals recorded on said medium.

24. The method of claim 23 wherein the recording and writing steps are not accomplished unless the beginning of the present selection of decoded data is stored in said buffer at the time the initiating step is executed.

25. The method of claim 23 further comprising the step of:

checking by the digital recorder for the availability of recording space on the recording medium and wherein the recording and writing step are not accomplished unless there is sufficient recording space to record the presently selected selection of decoded signals.

* * * * *